(12) United States Patent
Komaba et al.

(10) Patent No.: US 11,121,372 B2
(45) Date of Patent: Sep. 14, 2021

(54) POSITIVE ELECTRODE ACTIVE MATERIAL FOR POTASSIUM ION BATTERY, POSITIVE ELECTRODE FOR POTASSIUM ION BATTERY, AND POTASSIUM ION BATTERY

(71) Applicant: Tokyo University of Science Foundation, Tokyo (JP)

(72) Inventors: Shinichi Komaba, Tokyo (JP); Kei Kubota, Tokyo (JP); Kuniko Chihara, Tokyo (JP); Akihiro Katogi, Tokyo (JP)

(73) Assignee: TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 16/463,789

(22) PCT Filed: Nov. 20, 2017

(86) PCT No.: PCT/JP2017/041726
§ 371 (c)(1),
(2) Date: May 23, 2019

(87) PCT Pub. No.: WO2018/097109
PCT Pub. Date: May 31, 2018

(65) Prior Publication Data
US 2019/0280299 A1    Sep. 12, 2019

(30) Foreign Application Priority Data
Nov. 25, 2016  (JP) .............................. JP2016-229130

(51) Int. Cl.
*H01M 4/58* (2010.01)
*C01G 31/00* (2006.01)
(Continued)

(52) U.S. Cl.
CPC .......... *H01M 4/5825* (2013.01); *C01B 25/45* (2013.01); *C01B 25/455* (2013.01);
(Continued)

(58) Field of Classification Search
CPC .... H01M 4/5825; H01M 4/58; H01M 10/054; H01M 2004/028; C01B 25/45; C01B 25/455; C01G 31/006; C01P 2006/40
See application file for complete search history.

(56) References Cited

U.S. PATENT DOCUMENTS 9,564,656 B1    2/2017 Zhamu et al.
2010/0319188 A1  12/2010 Yamazaki et al.
(Continued)

FOREIGN PATENT DOCUMENTS

JP    2003-151549 A    5/2003
JP    2011-023710 A    2/2011
(Continued)

OTHER PUBLICATIONS

Extended European Search Report, dated Oct. 31, 2019, EP Appl. No. 17873670.8 (PCT/JP2017/041726), 10 pages.
Stanislav S. Fedotov et al., "AVPO 4 F (A=Li,K); A 4 V Cathode Material for High-Power Rechargeable Batteries," Chemistry of Materials, vol. 28, No. 2, Jan. 26, 2016, pp. 411-415, 5 pages.
(Continued)

*Primary Examiner* — Andrew J. Oyer
(74) *Attorney, Agent, or Firm* — Polsinelli PC

(57) ABSTRACT

Provided is the positive electrode active material for a potassium ion battery according to the embodiment comprises a compound represented by Formula (1), in which M represents at least one element selected from the group consisting of V, Fe, Co, Ni, and Mn, and x represents a number from 0 to 1; and is a positive electrode for a potassium ion battery comprising the positive electrode active material for a potassium ion battery according to the embodiment, or a potassium ion battery comprising the positive electrode for a potassium ion battery.

$KMO_xPO_4F_{1-x}$    [Formula (1)].

5 Claims, 18 Drawing Sheets

(51) Int. Cl.
  *H01M 10/054* (2010.01)
  *C01B 25/455* (2006.01)
  *C01B 25/45* (2006.01)
  *H01M 4/02* (2006.01)

(52) U.S. Cl.
  CPC ............ *C01G 31/006* (2013.01); *H01M 4/58* (2013.01); *H01M 10/054* (2013.01); *C01P 2006/40* (2013.01); *H01M 2004/028* (2013.01)

(56) References Cited

U.S. PATENT DOCUMENTS

2017/0294676 A1   10/2017   Komaba et al.
2017/0373310 A1*  12/2017   Whittingham ....... C01G 31/006

FOREIGN PATENT DOCUMENTS

WO   2016/059907 A1   4/2016
WO   2017/058061 A1   4/2017

OTHER PUBLICATIONS

N. Dupre et al., "Positive electrode materials for lithium batteries based on VOPO4," Solid State Ionics, North Holland Pub. Company, Amsterdam, NL, vol. 140, No. 3-4, Apr. 1, 2001, pp. 209-221, 13 pages.

Mark L. F. Phillips et al., "Electronic effects of substitution chemistry in the potassium titanyl phosphate (KTiOPO4) structure and optical properties of potassium vanadyl phosphate," Inorganic Chemistry, vol. 29, No. 11, May 1, 1990, pp. 2158-2163, 6 pages.

Fadila Berrah et al., "The vanadium monophosphates AVOPO4: Synthesis of a second form [beta]-KVOPO4 and structural relationships in the series," Solid State Sciences, vol. 3, No. 4, May 1, 2001, pp. 477-482, 6 pages.

Vaalma et al., "Non-Aqueous K-Ion Battery Based on Layered K0.3MnO2 and Hard Carbon/Carbon Black," Journal of the Electrochemical Society, 163 (7), Apr. 21, 2016, pp. A1295-A1299.

Eftekhari, "Potassium secondary cell based on Prussian blue cathode," Journal of Power Sources, 126, 2004, pp. 221-228.

* cited by examiner

POSITIVE ELECTRODE ACTIVE MATERIAL FOR POTASSIUM ION BATTERY, POSITIVE ELECTRODE FOR POTASSIUM ION BATTERY, AND POTASSIUM ION BATTERY

TECHNICAL FIELD

The present invention relates to a positive electrode active material for a potassium ion battery, a positive electrode for a potassium ion battery, and a potassium ion battery.

BACKGROUND ART

At present, as a high energy density secondary battery, a non-aqueous electrolyte secondary battery is widely used, for example, in which a non-aqueous electrolyte is used and lithium ions are transferred between a positive electrode and a negative electrode to perform charging and discharging.

In such non-aqueous electrolyte secondary batteries, generally, lithium transition metal complex oxide having a layered structure such as lithium nickelate ($LiNiO_2$) or lithium cobaltate ($LiCoO_2$) is used as a positive electrode, and a carbon material, lithium metal, lithium alloy, or the like capable of absorbing and desorbing lithium is used as a negative electrode (see, for example, Japanese Patent Application Laid-Open (JP-A) No. 2003-151549).

As a secondary battery that can be charged and discharged, a lithium ion secondary battery capable of achieving high energy density at high voltage have been mainly used so far, but the amount of lithium resources is relatively limited, and lithium is expensive. Lithium resources are localized in South America, and Japan relies entirely on imports from overseas. Under such circumstances, a sodium ion secondary battery replacing a lithium ion secondary battery is currently under development for cost reduction and stable supply of batteries. However, sodium has a larger atomic weight than lithium, a standard electrode potential of about 0.33 V higher than lithium, and a low cell voltage, and therefore, there is a problem that it is difficult to achieve high capacity.

Recently, research on non-aqueous electrolyte secondary batteries using potassium ion instead of lithium ion and sodium ion has been started.

Since an electrode active material constituting a potassium ion secondary battery, in particular, a positive electrode active material must be a source of potassium ions, such an active material needs to be a potassium compound containing potassium as a constituent element. At present, as a positive electrode active material for a potassium ion secondary battery, for example, those consisting of crystalline $K_{0.3}MnO_2$ having a layered rock salt type structure (see Christoph Vaalma, et al., Journal of The Electrochemical Society, 163 (7), A1295-A1299 (2016)), those consisting of a Prussian blue-based material crystal (see Ali Eftekhari, Journal of Power Sources, 126, 221-228 (2004)), and the like are known.

SUMMARY OF INVENTION

Technical Problem

The problem to be solved by the invention is to provide a positive electrode active material for a potassium ion battery from which a potassium ion battery having high output and having less deterioration in the charge-discharge capacity even after repeated charging and discharging is obtained, and a positive electrode for a potassium ion battery including the positive electrode active material for a potassium ion battery, or a potassium ion battery including the positive electrode for a potassium ion battery.

Solution to Problem

The above problems are solved by the means described in <1>, <5> or <6> below. These means are described below together with <2> to <4> which are preferred embodiments.
<1> A positive electrode active material for a potassium ion battery positive, the electrode active material comprising a compound represented by the following Formula (1):

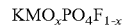
[Formula (1)], wherein, in Formula (1), M represents at least one element selected from the group consisting of V, Fe, Co, Ni, and Mn, and x represents a number from 0 to 1.
<2> The positive electrode active material for a potassium ion battery according to <1>, wherein M in Formula (1) is V.
<3> The positive electrode active material for a potassium ion battery according to <1> or <2>, wherein x in Formula (1) is a number from higher than 0 to 1.
<4> The positive electrode active material for a potassium ion battery according to any one of <1> to <3>, wherein x in Formula (1) is 1.
<5> A positive electrode for a potassium ion battery, the positive electrode comprising the positive electrode active material for a potassium ion battery according to any one of <1> to <4>.
<6> A potassium ion battery, comprising the positive electrode for a potassium ion battery according to <5>.

Advantageous Effects of Invention

According to the invention, a positive electrode active material for a potassium ion battery from which a potassium ion battery having high output and having less deterioration in the charge-discharge capacity even after repeated charging and discharging is obtained, and a positive electrode for a potassium ion battery including the positive electrode active material for a potassium ion battery, or a potassium ion battery including the positive electrode for a potassium ion battery can be provided.

DESCRIPTION OF EMBODIMENTS

Figure 1:
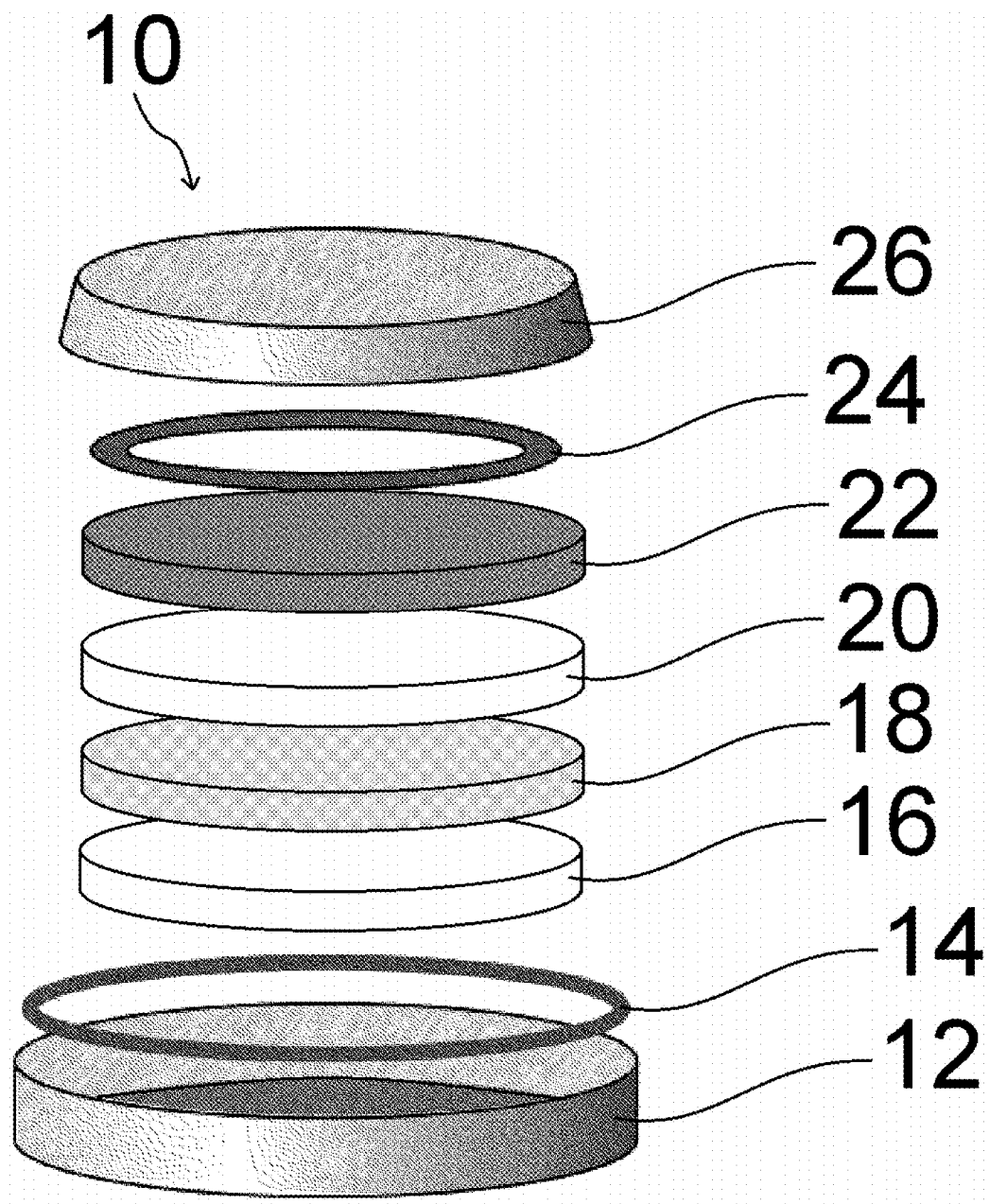
FIG. 1 is a schematic view showing an example of a potassium ion battery 10 according to the embodiment.
Figure 2:
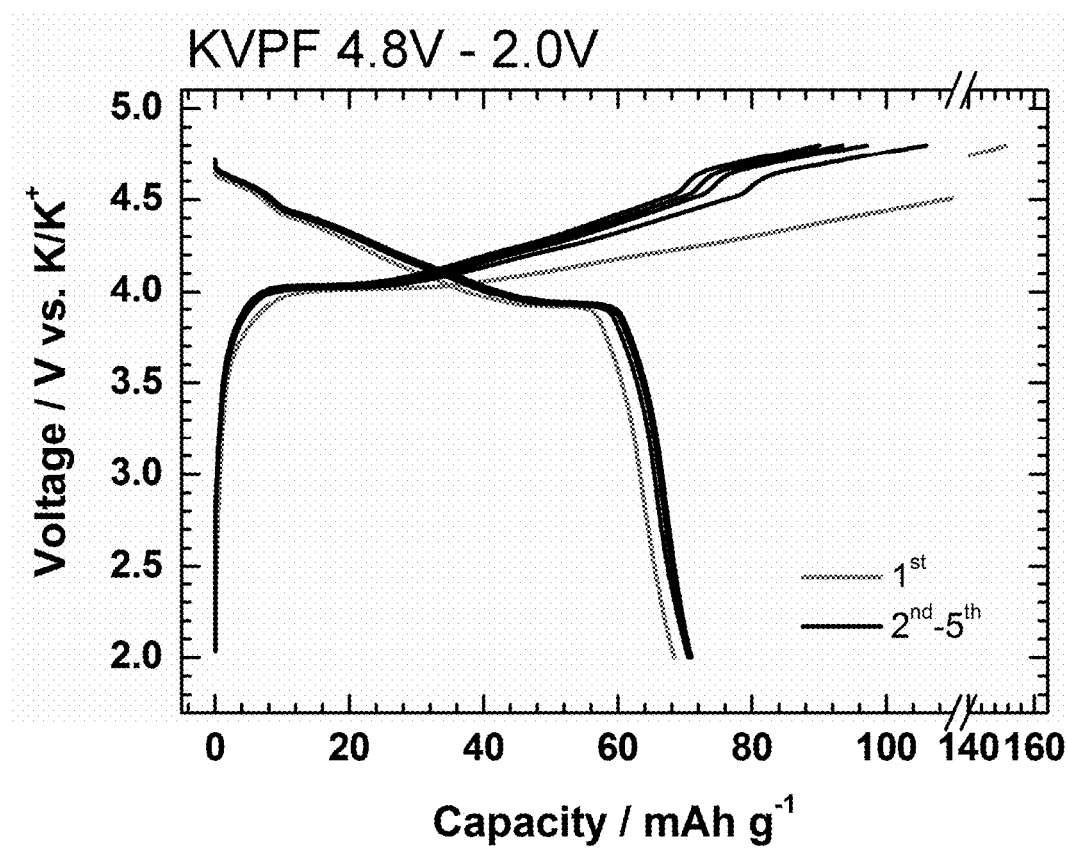
FIG. 2 is a charge-discharge profile up to the fifth cycle when a positive electrode for a potassium ion battery containing KVPF and acetylene black as a conductive aid, and an electrolytic solution A is used, and the charge-discharge voltage is set to from 4.8 V to 2.0 V.
Figure 3:
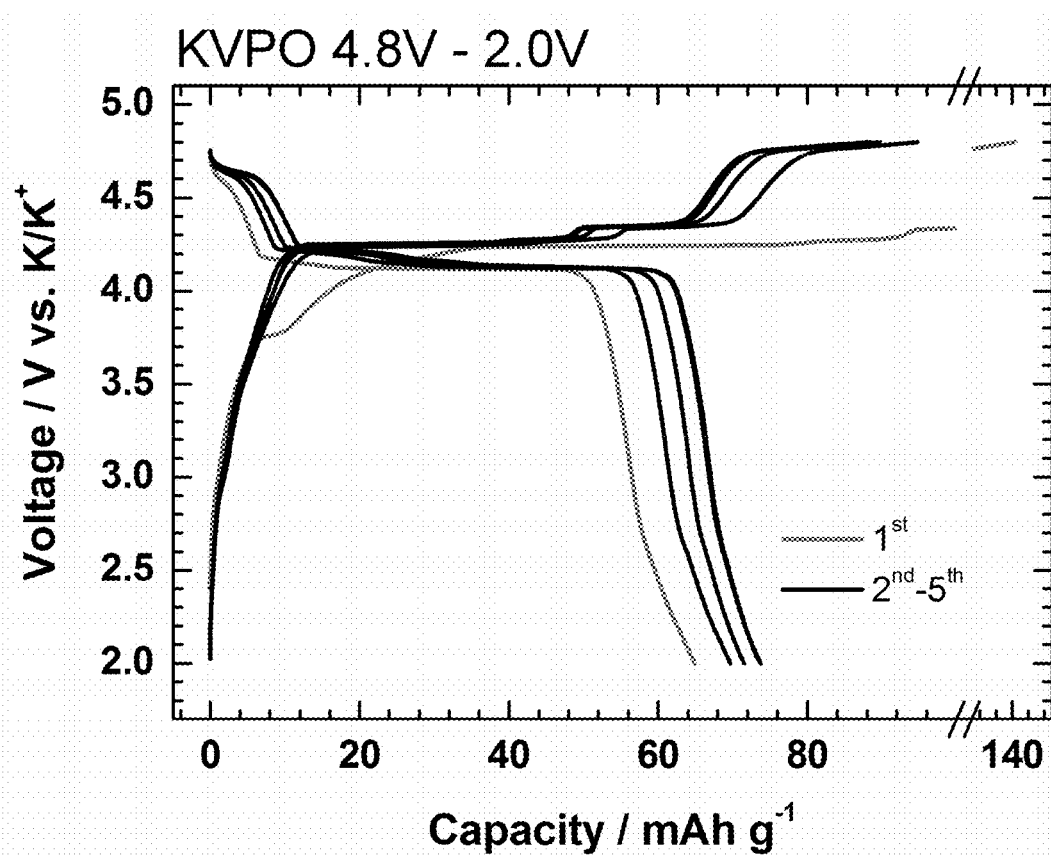
FIG. 3 is a charge-discharge profile up to the fifth cycle when a positive electrode for a potassium ion battery containing KVPO and acetylene black as a conductive aid, and an electrolytic solution A is used, and the charge-discharge voltage is set to from 4.8 V to 2.0 V.
Figure 4:
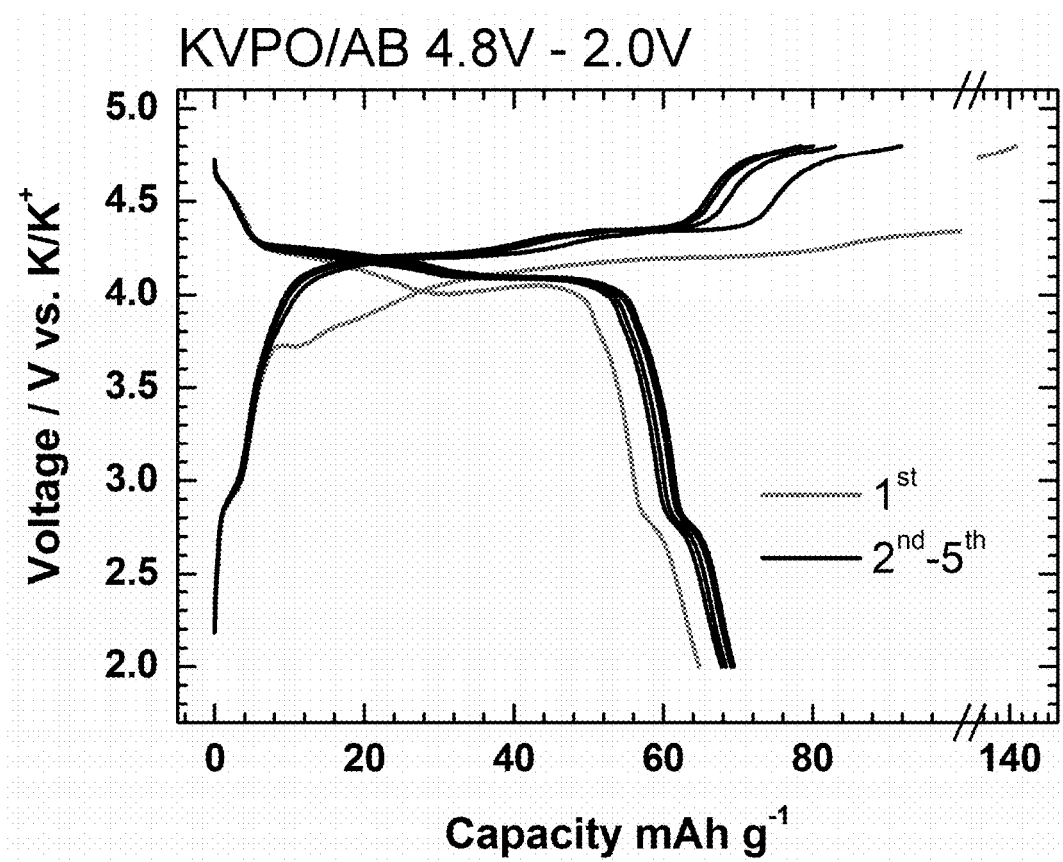
FIG. 4 is a charge-discharge profile up to the fifth cycle when a positive electrode for a potassium ion battery containing KVPO/AB and acetylene black as a conductive aid, and an electrolytic solution A is used, and the charge-discharge voltage is set to from 4.8 V to 2.0 V.

Hereinafter, the contents of the invention will be described in detail. The description of the configuration requirements described below may be made based on the representative embodiments of the invention, but the invention is not limited to such embodiments. Herein, "from A to B" is used in the meaning including the numerical values A and B as the lower limit value and the upper limit, respectively.

In the embodiment, "% by mass" and "% by weight" are synonymous, and "parts by mass" and "parts by weight" are synonymous.

In the embodiment, a combination of two or more preferable aspects is a more preferable aspect.

(Positive Electrode Active Material for Potassium Ion Battery)

The positive electrode active material for a potassium ion battery according to the embodiment comprising a compound represented by the following Formula (1):

$$KMO_xPO_4F_{1-x} \qquad \text{[Formula (1)],}$$

wherein, in Formula (1), M represents at least one element selected from the group consisting of V, Fe, Co, Ni, and Mn, and x represents a number from 0 to 1.

The positive electrode active material for a potassium ion battery according to the embodiment is preferably used as a positive electrode active material for a potassium ion secondary battery.

As mentioned above, the amount of lithium resources is relatively limited, and lithium is expensive. Lithium resources are localized in South America, and for example, Japan relies entirely on imports from overseas.

On the other hand, since potassium is abundantly contained in both seawater and the crust, potassium is a stable resource and can also reduce costs.

Specifically, the global production of lithium in 2012 is 34,970 t in terms of net content, and the production of potassium is 27,146 t in terms of net content.

Although in the case of a lithium ion battery, since lithium forms an alloy with various metals such as aluminum, expensive copper has to be used for a negative electrode substrate, potassium does not form an alloy with aluminum, and the use of inexpensive aluminum instead of copper for the negative electrode substrate is also a significant cost reduction advantage.

Since an electrode active material constituting a potassium ion secondary battery, in particular, a positive electrode active material must be a source of potassium ions, such an active material needs to be a potassium compound containing potassium as a constituent element.

At present, although a positive electrode active material for a potassium ion battery or the like described in the above Christoph Vaalma, et al., *Journal of The Electrochemical Society*, 163(7), A1295-A1299 (2016), or Ali Eftekhari, *Journal of Power Sources*, 126, 221-228 (2004) is known, as a positive electrode active material for a potassium ion battery, there has not been found any material capable of obtaining an output sufficient for practical use.

In the embodiment, by using a compound represented by Formula (1) for a positive electrode active material for a potassium ion battery, a potassium ion battery having high output and having less deterioration in the charge-discharge capacity even after repeated charging and discharging is obtained.

In the compound represented by Formula (1), it is estimated that when x is 1, M is trivalent and when x is 0, M is tetravalent, and it is estimated that potassium ion in the compound represented by Formula (1) is released when the valence increases.

From the viewpoint of output and the charge-discharge capacity in a potassium ion battery, the positive electrode active material for a potassium ion battery according to the embodiment preferably contains, with respect to the total mass of the positive electrode active material for potassium ion batteries, 50% by mass or more of the compound represented by Formula (1), more preferably contains 80% by mass or more of the compound represented by Formula (1), yet more preferably contains 90% by mass or more of the compound represented by Formula (1), and particularly preferably is composed of the compound represented by Formula (1).

The positive electrode active material for a potassium ion battery according to the embodiment may contain, as an impurity, a compound in which potassium of the compound represented by Formula (1) is substituted by lithium or sodium.

M in Formula (1) may be only one kind of element selected from the group consisting of V, Fe, Co, Ni, and Mn or may be two or more kinds of elements.

From the viewpoint of the output and charge-discharge capacity of a potassium ion battery and the ease of handling of the compound, M in Formula (1) is preferably at least one element selected from the group consisting of V, Fe, and Mn, and is particularly preferably V.

When x in Formula (1) is 1, the compound represented by Formula (1) is $KMOPO_4$, when x in Formula (1) is 0, the compound represented by Formula (1) is $KMPO_4F$, and when x in Formula (1) is a number from more than 0 to less than 1, the compound represented by Formula (1) is a mixture or a solid solution (including mixed crystals) of $KMOPO_4$ and $KMPO_4F$.

It is preferable that x in Formula (1) is from higher than 0 to 1, and more preferably 1 from the viewpoint of handleability and cost. On the other hand, it is preferable that x in Formula (1) is 0 from a viewpoint of the purity of the compound.

Specific examples of the compound represented by Formula (1) include $KVOPO_4$, $KVPO_4F$, $KVO_{0.1}PO_4F_{0.9}$, $KVO_{0.3}PO_4F_{0.7}$, $KVO_{0.9}PO_4F_{0.1}$, $KFeOPO_4$, $KFePO_4F$, $KFeO_{0.1}PO_4F_{0.9}$, $KFeO_{0.3}PO_4F_{0.7}$, $KFeO_{0.9}PO_4F_{0.1}$, $KCoOPO_4$, $KCoPO_4F$, $KCoO_{0.1}PO_4F_{0.9}$, $KCoO_{0.3}PO_4F_{0.7}$, $CoO_{0.9}PO_4F_{0.1}$, $KMnOPO_4$, $KMnPO_4F$, $KMnO_{0.1}PO_4F_{0.9}$, $KMnO_{0.3}PO_4F_{0.7}$, and $KMnO_{0.9}PO_4F_{0.1}$.

The shape of the positive electrode active material for a potassium ion battery according to the embodiment is not particularly limited as long as the shape is a desired shape, and is preferably a particulate positive electrode active material from the viewpoint of dispersibility when forming a positive electrode.

When the shape of the positive electrode active material for a potassium ion battery according to the embodiment is particulate, from the viewpoint of dispersibility and durability of a positive electrode, the arithmetic mean particle size of the positive electrode active material for a potassium ion battery according to the embodiment is preferably from 10 nm to 200 μm, more preferably from 50 nm to 100 μm, yet more preferably from 100 nm to 80 μm, and particularly preferably from 200 nm to 50 μm.

The arithmetic mean particle size in the embodiment can be suitably measured, for example, by using HORIBA LASER SCATTERING PARTICLE SIZE DISTRIBUTION ANALYZER LA-950 manufactured by HORIBA, Ltd. in conditions of dispersion medium: water, and wavelength of laser used: 650 nm and 405 nm.

For a positive electrode described below, a positive electrode active material inside the positive electrode can be separated using a solvent or the like or physically separated and measurement can be performed.

A method of manufacturing a compound represented by Formula (1) is not particularly limited, and examples thereof preferably include a solid phase method such as a two-step solid phase firing method.

The solid phase method is a method in which powder raw materials are weighed and mixed in such a manner to have a predetermined composition, and then synthesized by a heat treatment.

In one example of the method of manufacturing a compound represented by Formula (1), when M is vanadium (V) and x is 0, a precursor obtained by mixing ammonium metavanadate ($NH_4VO_3$) and ammonium dihydrogen phosphate ($NH_4H_2PO_4$) in water at a stoichiometric ratio of 1:1 and dehydrating to dryness at 140° C. is put into a crucible and subjected to solid phase firing under an argon (Ar) atmosphere, and $VPO_4$ is synthesized. The mixture is mixed with potassium fluoride (KF) at a stoichiometric ratio of 1:1, calcined for 1 hour, and quenched to room temperature (25° C.) to obtain $KVPO_4F$.

In one example of the method of manufacturing a compound represented by Formula (1), when M is V and x is 1, a precursor obtained by mixing ammonium metavanadate ($NH_4VO_3$), ammonium dihydrogen phosphate ($NH_4H_2PO_4$), and potassium carbonate ($K_2CO_3$) in water at a stoichiometric ratio of 1:1:1 and dehydrating to dryness at 140° C. is put into a crucible and subjected to solid phase firing under an argon (Ar) atmosphere, and a precursor is synthesized. The obtained precursor is further subjected to solid phase firing at 800° C., and slowly cooled to obtain $KVOPO_4$. During solid phase firing at 800° C., it is preferable to wrap the obtained precursor in a copper foil or to mix the obtained precursor with a small amount of carbon powder and to perform solid phase firing.

(Positive Electrode for Potassium Ion Battery)

The positive electrode for a potassium ion battery according to the embodiment includes the positive electrode active material for a potassium ion battery according to the embodiment.

The positive electrode for a potassium ion battery according to the embodiment may contain another compound other than the positive electrode active material for a potassium ion battery according to the embodiment.

The other compounds are not particularly limited, and known additives used for preparing a positive electrode of a battery can be used. Specific examples thereof include a conductive aid, a binder, and a current collector.

From the viewpoint of durability and formability, it is preferable that the positive electrode for a potassium ion battery according to the embodiment contains the positive electrode active material for a potassium ion battery according to the embodiment, a conductive aid, and a binder.

The shape and size of the positive electrode for a potassium ion battery according to the embodiment are not particularly limited, and may be any desired shape and size according to the shape and size of a battery used.

From the viewpoint of the output and charge-discharge capacity in a potassium ion battery, the positive electrode for the potassium ion battery according to the embodiment preferably contains, based on the total mass of the positive electrode for the potassium ion battery, a compound represented by Formula (1) in an amount of 10% by mass or more, more preferably in an amount of 20% by mass or more, yet more preferably in an amount of 50% by mass or more, and particularly preferably in an amount of 70% by mass or more.

<Conductive Aid>

In the positive electrode for a potassium ion battery according to the embodiment, the positive electrode active material for a potassium ion battery according to the embodiment may be formed into a desired shape and used as it is as a positive electrode, and in order to improve the rate performance (output) of the positive electrode, the positive electrode for a potassium ion battery according to the embodiment preferably further includes a conductive aid.

Preferable examples of the conductive aid used for the embodiment include a carbon such as a carbon black, a graphite, a carbon nanotube (CNT), or a vapor growth carbon fiber (VGCF).

Examples of the carbon black include acetylene black, oil furnace carbon black, and Ketjen black. Among them, from the viewpoint of conductivity, at least one conductive aid selected from the group consisting of acetylene black and Ketjen black is preferable, and acetylene black or Ketjen black is more preferable.

The conductive aid may be used singly or in combination of two or more kinds thereof.

The mixing ratio of the positive electrode active material to the conductive aid is not particularly limited, and the content of the conductive aid in the positive electrode is, based on the total mass of the positive electrode active material contained in the positive electrode, preferably from 1% by mass to 80% by mass, more preferably from 2% by mass to 60% by mass, yet more preferably from 5% by mass to 50% by mass, and particularly preferably from 5% by mass to 25% by mass. When the content is in the above range, a positive electrode of higher output can be obtained, and the durability of the positive electrode is excellent.

As a method of mixing the conductive aid and the positive electrode active material, the positive electrode active material can be coated with the conductive aid by mixing the positive electrode active material with the conductive aid under an inert gas atmosphere. Nitrogen gas, argon gas, or the like can be used as an inert gas, and argon gas can be used suitably.

When mixing the conductive aid and the positive electrode active material, a pulverizing and dispersing treatment may be performed using a dry ball mill, a bead mill to which a dispersion medium such as a small amount of water is added, or the like. The adhesion and dispersibility of the conductive aid and the positive electrode active material can be improved by the pulverizing and dispersing treatment, and the electrode density can be increased.

<Binder>

The positive electrode for a potassium ion battery according to the embodiment preferably further includes a binder from the viewpoint of formability.

The binder is not particularly limited, and a known binder can be used. Examples thereof include a polymer compound, and preferable examples thereof include a fluororesin, a polyolefin resin, a rubbery polymer, a polyamide resin, a polyimide resin (polyamide imide or the like), and a cellulose ether.

Specific examples of the binder include polyvinylidene fluoride (PVDF), vinylidene fluoride-hexafluoropropylene fluororubber (VDF-HFP fluororubber), vinylidene fluoride-hexafluoropropyl ene-tetrafluoroethylene-based fluororubber (VDF-HFP-TFE-based fluororubber), polyethylene, aromatic polyamide, cellulose, styrene-butadiene rubber, isoprene rubber, butadiene rubber, ethylene-propylene rubber, styrene-butadiene-styrene block copolymer, a hydrogenated substance thereof, styrene-ethylene-butadiene-styrene copolymer, styrene-isoprene-styrene block copolymer, a hydrogenated substance thereof, syndiotactic-1,2-polybutadiene, ethylene-vinyl acetate copolymer, propylene-α-olefin (carbon number: from 2 to 12) copolymer, starch, methyl cellulose, carboxymethyl cellulose, hydroxymethyl cellulose, hydroxyethyl cellulose, hydroxypropyl cellulose, carboxymethyl hydroxyethyl cellulose, nitrocellulose, polyacrylic acid, sodium polyacrylate, and polyacrylonitrile.

From the viewpoint of increasing the electrode density, the specific gravity of a compound used as the binder is preferably greater than 1.2 $g/cm^3$.

From the viewpoint of increasing the electrode density and the adhesion, the weight average molecular weight of the binder is preferably 1,000 or more, more preferably 5,000 or more, and yet more preferably 10,000 or more. There is no particular upper limit, and is preferably 2,000,000 or less.

The binder may be used singly or in combination of two or more kinds thereof.

The mixing ratio of the positive electrode active material and the binder is not particularly limited, and the content of the binder in the positive electrode is, with respect to the total mass of the positive electrode active material contained in the positive electrode, preferably from 0.5% by mass to 30% by mass, more preferably from 1% by mass to 20% by mass, and yet more preferably from 2% by mass to 15% by mass. When the content is in the above range, the formability and durability are excellent.

There is no particular limitation on a method of manufacturing a positive electrode containing a positive electrode active material, a conductive aid, and a binder, and for example, the manufacturing method may be a method in which a positive electrode active material, a conductive aid, and a binder are mixed, and pressure molding is performed, or a method in which a slurry described below is prepared, and a positive electrode is formed.

<Current Collector>

The positive electrode for a potassium ion battery according to the embodiment may further include a current collector.

Examples of the current collector include a foil made of a conductive material such as nickel, aluminum, or stainless steel (SUS), a mesh, an expanded grid (expanded metal), and a punched metal. The openings of the mesh, the wire diameter, the number of meshes, and the like are not particularly limited, and conventionally known ones can be used.

The shape of the current collector is not particularly limited, and may be selected in accordance with a desired shape of the positive electrode. Examples of the shape include foil-like and plate-like shapes.

The method of forming a positive electrode on a current collector is not particularly limited, and examples thereof include a method of mixing a positive electrode active material, a conductive aid, a binder, and an organic solvent or water to prepare a positive electrode active material slurry and coating the slurry on the current collector. Examples of the organic solvent include an amine-based solvent such as N,N-dimethylaminopropylamine or diethyltriamine; an ether-based solvent such as ethylene oxide or tetrahydrofuran; a ketone-based solvent such as methyl ethyl ketone; an ester-based solvent such as methyl acetate, and an aprotic polar solvent such as dimethylacetamide or N-methyl-2-pyrrolidone.

A positive electrode is manufactured by, for example, applying the prepared slurry onto a current collector, fixing the slurry by pressing after drying and the like. Examples of the method of applying a slurry on a current collector include slit die coating, screen coating, curtain coating, knife coating, gravure coating, and electrostatic spraying.

(Potassium Ion Battery)

The potassium ion battery according to the embodiment includes the positive electrode for a potassium ion battery according to the embodiment.

The potassium ion battery according to the embodiment can be suitably used as a potassium ion secondary battery.

The potassium ion battery according to the embodiment preferably includes the positive electrode for a potassium ion battery according to the embodiment, a negative electrode, and an electrolyte.

<Negative Electrode>

The negative electrode used in the embodiment may be any one containing a negative electrode active material, and examples thereof include those made of a negative electrode active material, and a current collector and a negative electrode active material layer formed on the surface of the current collector, wherein the negative electrode active material layer contains a negative electrode active material and a binder.

The current collector is not particularly limited, and the current collector described above in the positive electrode can be suitably used.

The shape and size of the negative electrode are not particularly limited, and may be any desired shape and size in accordance with the shape and size of a battery used.

Examples of the negative electrode active material include a carbon material such as natural graphite, artificial graphite, a coke, hard carbon, carbon black, a pyrolytic carbon, a carbon fiber, and a sintered product of an organic polymer compound. The shape of the carbon material may be, for example, a flaky shape such as natural graphite, a sphere shape such as a mesocarbon microbead, a fiber shape such as graphitized carbon fiber, or a particulate aggregate. Here, the carbon material may function as a conductive aid.

Among them, graphite or hard carbon is preferable, and graphite is more preferable.

Potassium metal can also be suitably used as the negative electrode active material.

Furthermore, as the negative electrode, the negative electrode described in WO 2016/059,907 can also be suitably used.

Graphite in the embodiment refers to a graphite-based carbon material.

Examples of the graphite-based carbon material include natural graphite, artificial graphite, and expanded graphite. As natural graphite, for example, scaly graphite, massive graphite, and the like can be used. As artificial graphite, for example, bulk graphite, vapor grown graphite, flake graphite, fibrous graphite, and the like can be used. Among these, scaly graphite and massive graphite are preferable because of high packing density and the like. Two or more types of graphite may be used in combination.

The average particle diameter of the graphite is, as an upper limit, preferably 30 μm, more preferably 15 μm, and yet more preferably 10 μm, and, as a lower limit, preferably 0.5 μm, more preferably 1 μm, and yet more preferably 2 μm. The average particle size of the graphite is a value measured by a method of electron microscope observation.

Examples of the graphite include one having an interplanar spacing d(002) of from 3.354 to 3.370 Å (angstrom, 1 Å=0.1 nm) and a crystallite size Lc of 150 Å or more.

The hard carbon in the embodiment is a carbon material in which the layering order hardly changes even when heat-treated at a high temperature of 2,000° C. or higher, and is also referred to as non-graphitizable carbon. Examples of the hard carbon include carbon fiber obtained by carbonizing infusible fiber, which is an intermediate product of carbon fiber manufacturing process, at about from 1,000° C. to 1,400° C. and a carbon material carbonized at about from 1,000° C. to 1,400° C. after air oxidation of an organic compound at about 150° C. to 300° C. The method of manufacturing a hard carbon is not particularly limited, and a hard carbon manufactured by a conventionally known method can be used.

The average particle diameter, the true density, the surface spacing of the (002) plane, and the like of the hard carbon are not particularly limited, and preferred ones can be selected and used as appropriate.

The negative electrode active material may be used singly or in combination of two or more kinds thereof.

The content of the negative electrode active material in the negative electrode active material layer is not particularly limited, and is preferably from 80 to 95% by mass.

<Electrolyte>

As the electrolyte used in the embodiment, any of an electrolytic solution and a solid electrolyte can be used.

The electrolytic solution is not particularly limited as long as the solution is an electrolytic solution having a potassium salt as a main electrolyte.

In the case of an aqueous electrolytic solution, examples of the potassium salt include $KClO_4$, $KPF_6$, $KNO_3$, $KOH$, $KCl$, $K_2SO_4$, and $K_2S$. These potassium salts can be used singly or in combination of two or more kinds thereof.

In the case of a non-aqueous electrolytic solution, for example, an electrolytic solution containing an electrolyte (such as $KPF_6$, $KBF_4$, $CF_3SO_3K$, $KAsF_6$, $KB(C_6H_5)_4$, $CH_3SO_3K$, $KN(SO_2CF_3)_2$, $KN(SO_2C_2F_5)_2$, $KC(SO_2CF_3)_3$, or $KN(SO_3CF_3)_2$) in a solvent such as propylene carbonate (PC) can be used, and in addition, such an electrolyte dissolved in a mixed solvent of ethylene carbonate (EC) and diethyl carbonate (DEC), such an electrolyte dissolved in a mixed solvent of ethylene carbonate (EC) and dimethyl carbonate (DMC), or the like can also be used as an electrolytic solution.

Among these, $KPF_6$ is preferable as the potassium salt.

Examples of the solvent of the electrolytic solution include a carbonate such as propylene carbonate, ethylene carbonate, dimethyl carbonate, diethyl carbonate, ethyl methyl carbonate, isopropyl methyl carbonate, vinylene carbonate, fluoroethylene carbonate, 4-trifluoromethyl-1,3-dioxolan-2-one, or 1,2-di (methoxycarbonyloxy) ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, or 2-methyltetrahydrofuran; an ester such as methyl formate, methyl acetate, or γ-butyrolactone; a nitrile such as acetonitrile or butyronitrile; an amide such as N,N-dimethylformamide or N,N-dimethylacetamide; a carbamate such as 3-methyl-2-oxazolidone; a sulfur-containing compound such as sulfolane, dimethyl sulfoxide, or 1,3-propanesultone; or those in which a fluoro group is further introduced as a substituent of a hydrogen atom to the above-described solvent.

The solvent of the electrolytic solution may be used singly or in combination of two or more kinds thereof, and it is preferable to use two or more kinds thereof in combination.

Among these, at least one solvent selected from the group consisting of propylene carbonate, ethylene carbonate, and diethyl carbonate is preferable, and a mixed solvent of at least two selected from the group consisting of propylene carbonate, ethylene carbonate, and diethyl carbonate is more preferable.

The concentration of the potassium salt in the electrolytic solution is not particularly limited, and is preferably from 0.1 mol/L to 2 mol/L, and more preferably from 0.5 mol/L to 1.5 mol/L.

A known solid electrolyte can be used as a solid electrolyte. For example, an organic solid electrolyte such as a polyethylene oxide-based polymer compound and a polymer compound containing at least one or more of a polyorganosiloxane chain and a polyoxyalkylene chain can be used. A so-called gel type one which holds a non-aqueous electrolyte solution in a polymer compound can also be used.

<Separator>

The potassium ion battery according to the embodiment preferably further includes a separator.

The separator physically isolates a positive electrode and a negative electrode to prevent an internal short circuit.

The separator is made of a porous material, pores of which are impregnated with an electrolyte, and have ion permeability (in particular, at least potassium ion permeability) in order to ensure cell reaction.

As the separator, for example, in addition to a porous membrane made of a resin, a non-woven fabric can be used. The separator may be formed of only a porous membrane layer or a non-woven fabric layer, or may be formed of a layered body of a plurality of layers different in composition and form. Examples of the layered body include a layered body having a plurality of resin porous layers different in composition, and a layered body having a porous membrane layer and a non-woven fabric layer.

The material of the separator can be selected in consideration of the operating temperature of a battery, the composition of an electrolyte, and the like.

Examples of a resin contained in a fiber forming a porous film and a nonwoven fabric include a polyolefin resin such as polyethylene, polypropylene, or ethylene-propylene copolymer; a polyphenylene sulfide resin such as polyphenylene sulfide or polyphenylene sulfide ketone; a polyamide resin such as an aromatic polyamide resin (aramid resin or the like); and a polyimide resin. These resins may be used singly, or two or more kinds thereof may be used in combination. The fiber forming the nonwoven fabric may be an inorganic fiber such as a glass fiber.

The separator is preferably a separator containing at least one material selected from the group consisting of glass, a polyolefin resin, a polyamide resin, and a polyphenylene sulfide resin. Among them, a more preferred example of the separator is a glass filter.

The separator may contain an inorganic filler.

Examples of the inorganic filler include ceramics (silica, alumina, zeolite, titania and the like), talc, mica, and wollastonite. The inorganic filler is preferably particulate or fibrous.

The content of the inorganic filler in the separator is preferably from 10% by mass to 90% by mass, and more preferably from 20% by mass to 80% by mass.

The shape and size of the separator are not particularly limited, and may be appropriately selected in accordance with a desired battery shape and the like.

In the potassium ion battery according to the embodiment, in addition to a battery case, a spacer, a gasket, and a leaf spring, various known materials conventionally used in lithium ion batteries and sodium ion batteries can be used for elements such as structural materials, without particular limitation.

The potassium ion battery according to the embodiment may be assembled according to a known method using the battery elements. In this case, the shape of the battery is not particularly limited, and various shapes and sizes, such as cylindrical, square, and coin shapes, can be appropriately adopted.

Although the potassium ion battery shown in FIG. 1 is exemplified as an example of the potassium ion battery according to the embodiment, it is needless to say that the invention is not limited thereto.

FIG. 1 is a schematic view showing an example of a potassium ion battery 10 according to the embodiment.

The potassium ion battery 10 shown in FIG. 1 is a coin type battery, and is formed by overlapping a battery case 12 on the negative electrode side, a gasket 14, a negative electrode 16, a separator 18, a positive electrode (positive electrode) 20 for the potassium ion battery according to the embodiment, a spacer 22, a leaf spring 24, and a battery case 26 on the positive electrode side sequentially from the negative electrode side, and fitting the battery case 12 and the battery case 26 together.

The separator 18 is impregnated with an electrolytic solution (not shown).

EXAMPLES

Hereinafter, the invention will be more specifically described by way of Examples. The materials, amounts used, proportions, treatment contents, treatment procedures, and the like shown in the following Examples can be changed as appropriate without departing from the spirit of the invention. Accordingly, the scope of the invention is not limited to the specific Examples shown below.

Example 1

<Synthesis of KVPF (KVPO$_4$F)>

A precursor prepared by mixing ammonium metavanadate (NH$_4$VO$_3$, manufactured by Aldrich Company) and ammonium dihydrogen phosphate (NH$_4$H$_2$PO$_4$, manufactured by Wako Pure Chemical Industries, Ltd.) in water at a stoichiometry ratio of 1:1 and dehydrating to dryness at 140° C. was put into a crucible, and solid phase firing was performed at 400° C. for 8 hours under an argon (Ar) atmosphere, and then at 800° C. for 8 hours, and VPO$_4$ was synthesized. After mixing potassium fluoride (KF, manufactured by Wako Pure Chemical Industries, Ltd.) with VPO$_4$ at a stoichiometric ratio of VPO$_4$:KF=1:1 and firing at 600° C. for 1 hour, KVPO$_4$F (KVPF) was obtained as dark purple particles by quenching to room temperature (25° C.).

The arithmetic mean particle size (secondary mean particle size) of the obtained KVPO$_4$F (KVPF) was 49.7 µm.

Example 2

<Synthesis of KVPO (KVOPO$_4$)>

A precursor prepared by mixing ammonium metavanadate (NH$_4$VO$_3$, manufactured by Aldrich Company), ammonium dihydrogen phosphate ($NH_4H_2PO_4$, manufactured by Wako Pure Chemical Industries, Ltd.), and potassium carbonate ($K_2CO_3$, manufactured by Wako Pure Chemical Industries, Ltd.) in water at a stoichiometry ratio of 1:1:1 and dehydrating to dryness at 140° C. was put into a crucible, and subjected to solid phase firing at 380° C. for 2 hours under an argon (Ar) atmosphere, and a precursor was synthesized. $KVOPO_4$ (KVPO) was obtained as brown particles in the same manner as described above except that the obtained precursor was wrapped with copper foil instead of mixing 1.5% by mass of acetylene black (manufactured by Strem Chemicals, Inc.) based on the total mass of the precursor with the obtained precursor.

The arithmetic mean particle size (secondary mean particle size) of the obtained $KVOPO_4$ (KVPO) was 44.3 µm.

Example 3

<Synthesis of KVPO/AB($KVOPO_4$)>

In the synthesis of KVPO, the obtained precursor was mixed with 1.5% by mass of acetylene black (manufactured by Strem Chemicals, Inc.) based on the total mass of the precursor, subjected to solid phase firing at 800° C. for 12 hours, and cooled slowly, and $KVOPO_4$ (KVPO/AB) was obtained as dark brown particles.

The arithmetic mean particle size (secondary mean particle size) of the obtained $KVOPO_4$ (KVPO/AB) was 6.7 µm.

Elemental analysis, X-ray diffraction structural analysis, and Raman spectrum were respectively measured for $KVPO_4F$ and two types of $KVOPO_4$ obtained above, and their chemical structures were identified. The arithmetic mean particle size was measured using HORIBA LASER SCATTERING PARTICLE SIZE DISTRIBUTION ANALYZER LA-950 manufactured by HORIBA, Ltd., using a dispersion medium: water, and a laser wavelength used: 650 nm and 405 nm.

<Preparation of Positive Electrode for Potassium Ion Battery>

A positive electrode was prepared by applying a mixture of the obtained $KVPO_4F$ or $KVOPO_4$, acetylene black (AB, manufactured by Denki Kagaku Kogyo Co., Ltd.), and PVDF (polyvinylidene fluoride, manufactured by Kureha Corporation) at a mass ratio of 70:25:5 or a mixture of the obtained $KVPO_4F$ or $KVOPO_4$, Ketjen black (KB, manufactured by LION SPECIALTY CHEMICALS CO., LTD.), and PVDF (polyvinylidene fluoride, manufactured by Kureha Corporation) at a mass ratio of 85:10:5 on aluminum foil (Hohsen Corp., thickness: 0.017 mm). The shape of a positive electrode not containing aluminum foil was a cylindrical shape having a diameter of 10 mm and a thickness of from 0.03 mm to 0.04 mm. The mass of a positive electrode not containing aluminum foil was from 3 mg to 5 mg.

<Measurement of Charging and Discharging>

Measurement of charging and discharging was performed in a coin cell prepared using 0.7 M $KPF_6$/ethylene carbonate (EC)-diethyl carbonate (DEC) (mass ratio EC:DEC=1:1) mixed solution (manufactured by KISHIDA CHEMICAL Co., Ltd.; electrolytic solution A) or 1 M $KPF_6$/ethylene carbonate (EC)-propylene carbonate (PC) (mass ratio EC:PC=1:1) mixed solution (electrolytic solution B) as an electrolytic solution, potassium metal (manufactured by Aldrich Company) as a negative electrode, and a separator (GLASS FILTER, manufactured by Hohsen Corp.), an SUS battery case, a polypropylene gasket (CR2032 manufactured by Hohsen Corp.), a spacer (material: SUS, diameter 16 mm×height 0.5 mm, manufactured by Hohsen Corp.), and a leaf spring (material: SUS, inner diameter 10 mm, height 2.0 mm, thickness 0.25 mm, WASHER manufactured by Hohsen Corp.).

The amount of the electrolytic solution used was such that the separator was sufficiently filled with the electrolytic solution (from 0.15 mL to 0.3 mL).

The electrolytic solution B was prepared using $KPF_6$ manufactured by Tokyo Chemical Industry Co., Ltd., ethylene carbonate manufactured by KISHIDA CHEMICAL Co., Ltd., and propylene carbonate manufactured by KISHIDA CHEMICAL Co., Ltd.

The measurement was performed at room temperature (25° C.) under charging and discharging conditions in which the charge-discharge current density was set to a constant current mode. Using a positive electrode described in each figure, the charging rate was set to 0.05 C (coulomb, 1 C=133 mAh), and constant current charging was performed to a charge voltage of 4.5 V, 4.8 V, or 5.0 V. After charging, constant current discharging was repeated until the charge voltage was 4.5 V, 4.8 V, or 5.0 V, and the discharge end voltage was 2.0 V. One charging and discharging is defined as one cycle, and reversible capacities (Capacity, unit: mAh/g, where h represents hour) measured in a specific cycle is shown below and in FIGS. 1 to 13.

The reversible capacity measured in a specific cycle when performing the charging and discharging measurement under the conditions of charge voltage 4.8 V and discharge end voltage 2.0 V using KVPF, acetylene black, and the electrolytic solution A was 71.88 mAh/g at the fifth cycle, and 71.68 mAh/g at the 50th cycle.

The reversible capacity measured in a specific cycle when performing the charging and discharging measurement under the conditions of charge voltage 4.8 V and discharge end voltage 2.0 V using KVPO, acetylene black, and the electrolytic solution A was 73.73 mAh/g at the fifth cycle, and 72.05 mAh/g at the 25th cycle.

The reversible capacity measured in a specific cycle when performing the charging and discharging measurement under the conditions of charge voltage 4.8 V and discharge end voltage 2.0 V using KVPO/AB, acetylene black, and the electrolytic solution A was 69.51 mAh/g at the fifth cycle, and 71.29 mAh/g at the 50th cycle.

The reversible capacity measured in a specific cycle when performing the charging and discharging measurement under the conditions of charge voltage 4.8 V and discharge end voltage 2.0 V using KVPF, acetylene black, and the electrolytic solution B was 71.88 mAh/g at the fifth cycle, and 71.68 mAh/g at the 50th cycle.

The reversible capacity measured in a specific cycle when performing the charging and discharging measurement under the conditions of charge voltage 5.0 V and discharge end voltage 2.0 V using KVPF, acetylene black, and the electrolytic solution A was 84.17 mAh/g at the fifth cycle, and 84.31 mAh/g at the 32nd cycle.

The reversible capacity measured in a specific cycle when performing the charging and discharging measurement under the conditions of charge voltage 5.0 V and discharge end voltage 2.0 V using KVPO, acetylene black, and the electrolytic solution A was 80.83 mAh/g at the fifth cycle, and 80.94 mAh/g at the 34th cycle.

The reversible capacity measured in a specific cycle when performing the charging and discharging measurement under the conditions of charge voltage 5.0 V and discharge end voltage 2.0 V using KVPO/AB, acetylene black, and the electrolytic solution A was 78.41 mAh/g at the fifth cycle, and 79.95 mAh/g at the 31st cycle.

The reversible capacity measured in a specific cycle when performing the charging and discharging measurement under the conditions of charge voltage 5.0 V and discharge end voltage 2.0 V using KVPF, acetylene black, and the electrolytic solution B was 92.3 mAh/g at the fifth cycle, and 80.37 mAh/g at the 50th cycle.

Figure 12:
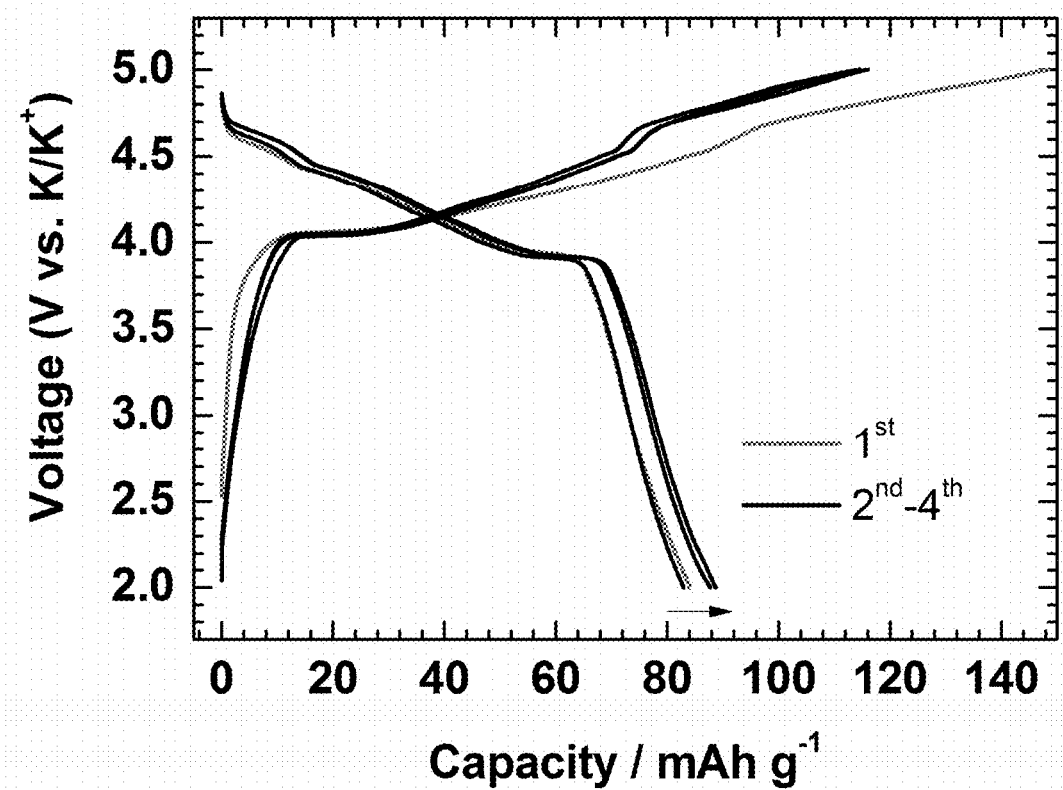
FIG. 12 is a charge-discharge profile up to the fourth cycle when a positive electrode for a potassium ion battery containing KVPF and Ketjen black as a conductive aid, and an electrolytic solution B is used, the charging rate is set to C/10, and the charge-discharge voltage is set to from 5.0 V to 2.0 V.
Figure 13:
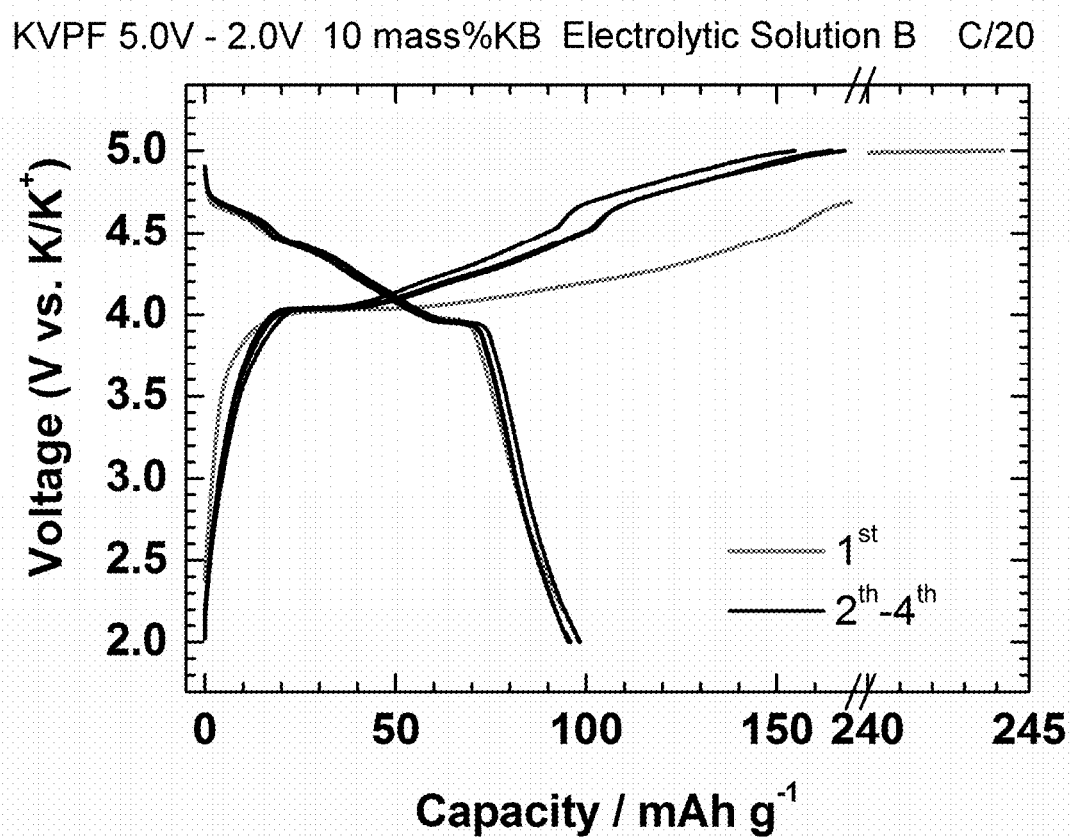
FIG. 13 is a charge-discharge profile up to the fourth cycle when a positive electrode for a potassium ion battery containing KVPF and Ketjen black as a conductive aid, and an electrolytic solution B is used, the charging rate is set to C/20, and the charge-discharge voltage is set to from 5.0 V to 2.0 V.

FIGS. 2 to 4, 6 to 8, and 10 show charge-discharge profiles up to the fifth cycle when each positive electrode active material for a potassium ion battery was used. FIG. 12 and FIG. 13 show charge-discharge profiles up to the fourth cycle when each positive electrode active material for a potassium ion battery was used. When a conductive aid is not specified in the upper left of each figure, the figure shows the charge-discharge profile when acetylene black was used, and when an electrolytic solution is not specified, the figure shows the charge-discharge profile when the electrolytic solution A was used. In FIG. 12, the charging rate was set to C/10=0.1 C.

In FIGS. 2 to 4, 6 to 8, 10, 12, and 13, the ordinate of the charge-discharge profiles represents the potential (Voltage, unit: V (V vs. $K/K^+$)) based on the standard unipolar potential of potassium, and the abscissa represents the capacity (Capacity, unit: mAh/g).

The reversible capacity measured in a specific cycle in the case shown in FIG. 12 was 84.08 mAh/g at the first cycle and 88.7 mAh/g at the fourth cycle.

The reversible capacity measured in a specific cycle in the case shown in FIG. 13 was 98.16 mAh/g at the first cycle and 98.34 mAh/g at the fourth cycle.

Figure 5:
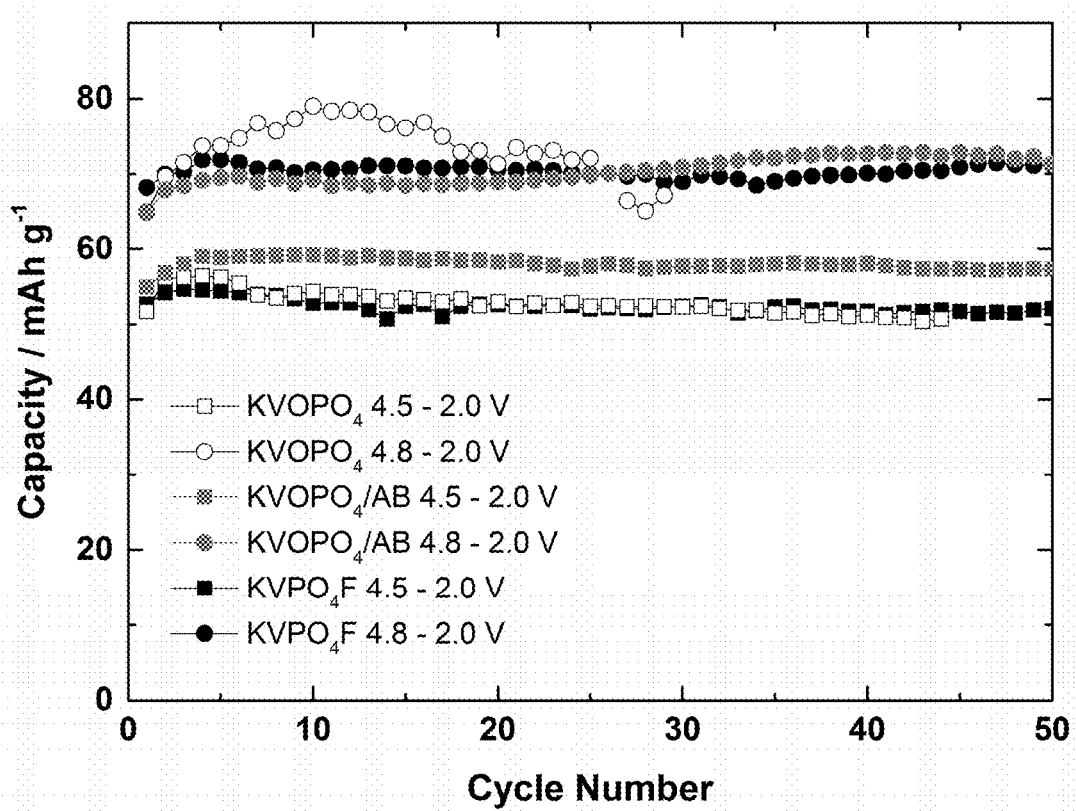
FIG. 5 is a diagram showing a change in reversible capacity in the course of a cycle when a positive electrode for a potassium ion battery containing KVPF, KVPO, or KVPO/AB, and acetylene black as a conductive aid and an electrolytic solution A are used, and the charge-discharge voltage is set to 4.5 V or from 4.8 V to 2.0 V.
Figure 6:
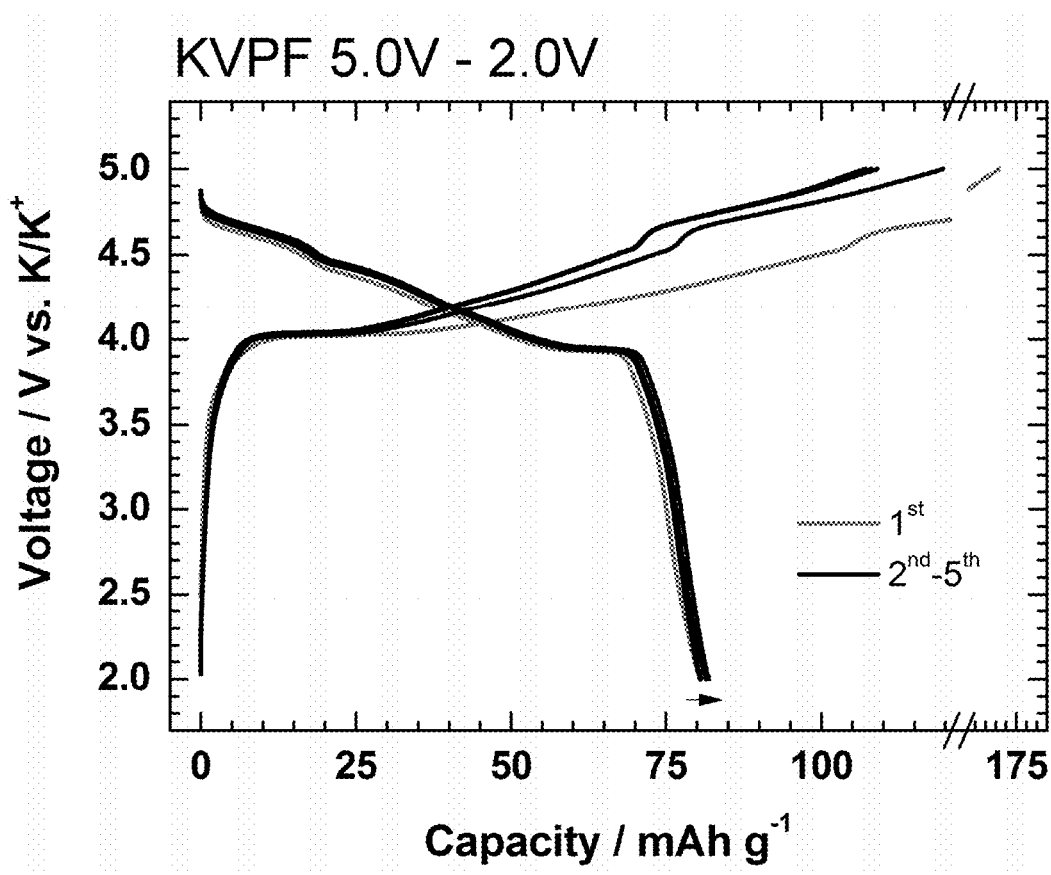
FIG. 6 is a charge-discharge profile up to the fifth cycle when a positive electrode for a potassium ion battery containing KVPF and acetylene black as a conductive aid, and an electrolytic solution A is used, and the charge-discharge voltage is set to from 5.0 V to 2.0 V.
Figure 7:
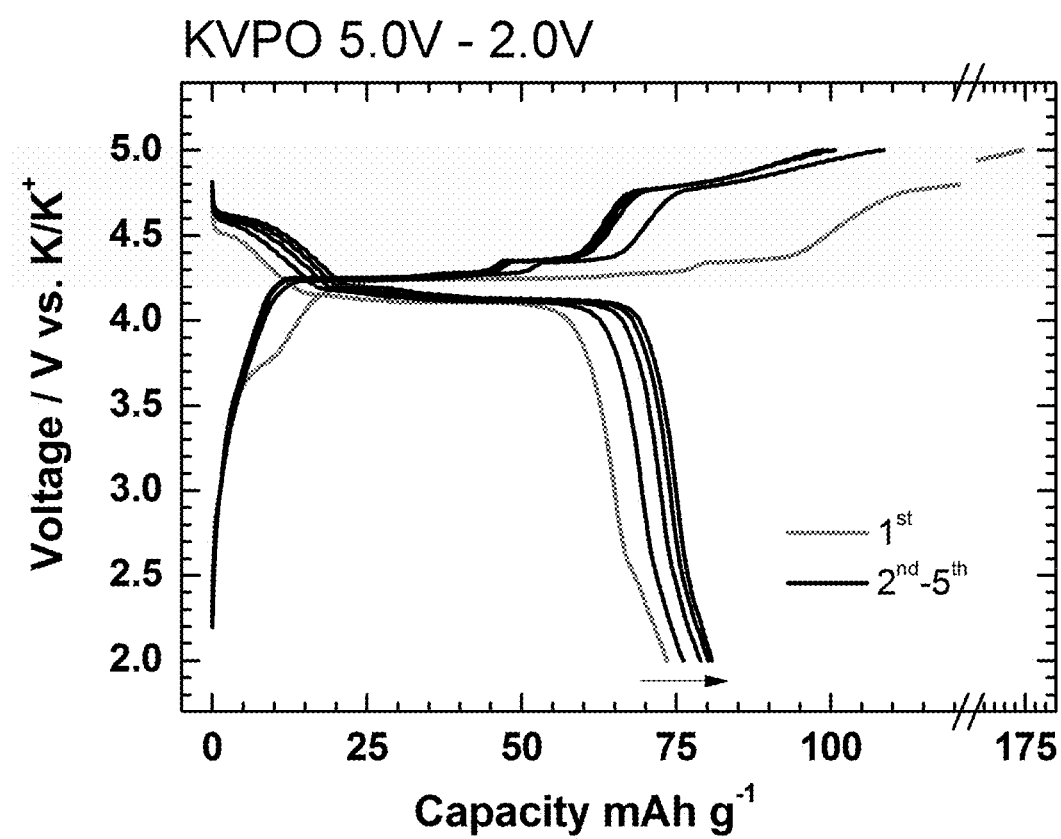
FIG. 7 is a charge-discharge profile up to the fifth cycle when a positive electrode for a potassium ion battery containing KVPO and acetylene black as a conductive aid, and an electrolytic solution A is used, and the charge-discharge voltage is set to from 5.0 V to 2.0 V.
Figure 8:
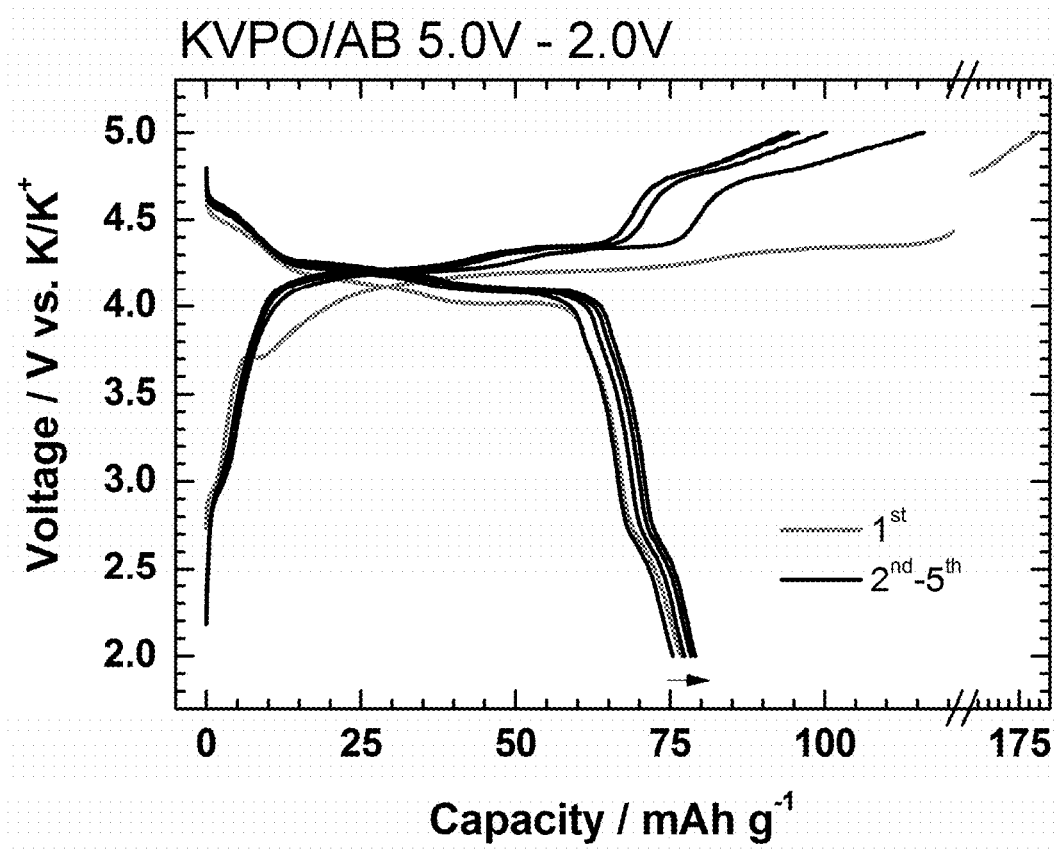
FIG. 8 is a charge-discharge profile up to the fifth cycle when a positive electrode for a potassium ion battery containing KVPO/AB and acetylene black as a conductive aid, and an electrolytic solution A is used, and the charge-discharge voltage is set to from 5.0 V to 2.0 V.
Figure 9:
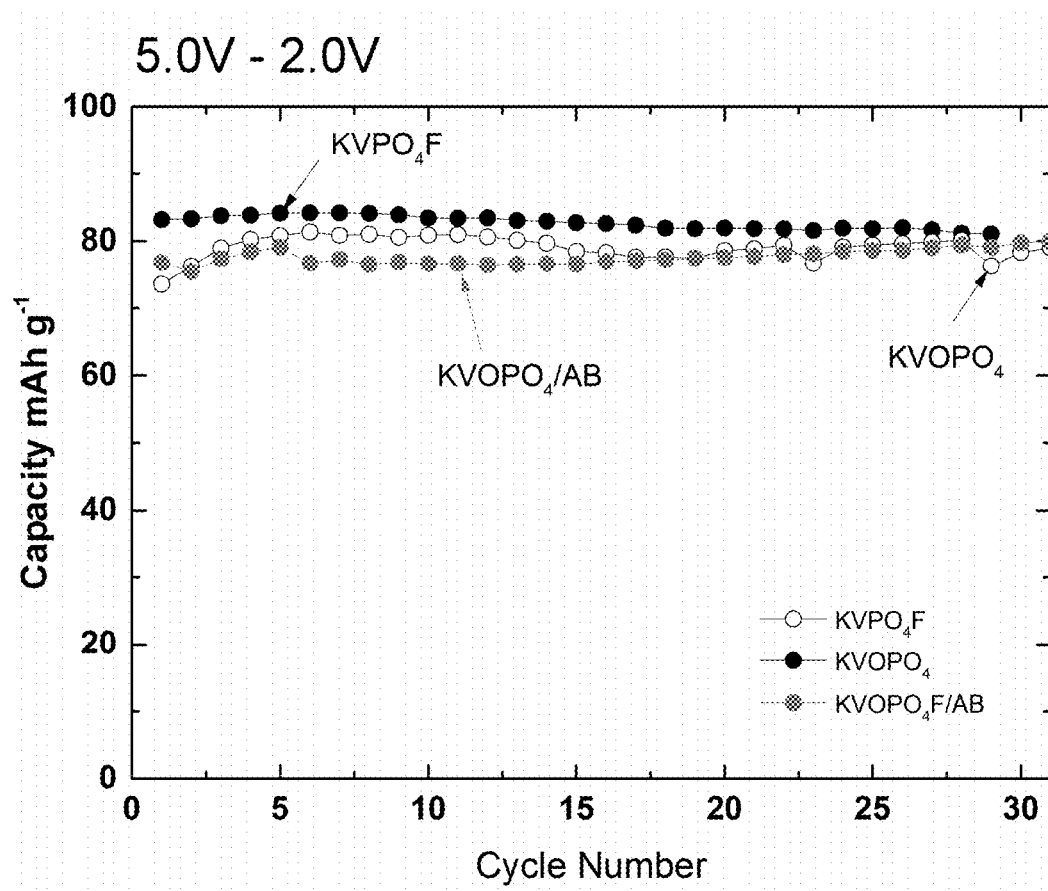
FIG. 9 is a diagram showing a change in reversible capacity in the course of a cycle when a positive electrode for a potassium ion battery containing KVPF, KVPO, or KVPO/AB, and acetylene black as a conductive aid and an electrolytic solution A are used, and the charge-discharge voltage is set to from 5.0 V to 2.0 V.
Figure 10:
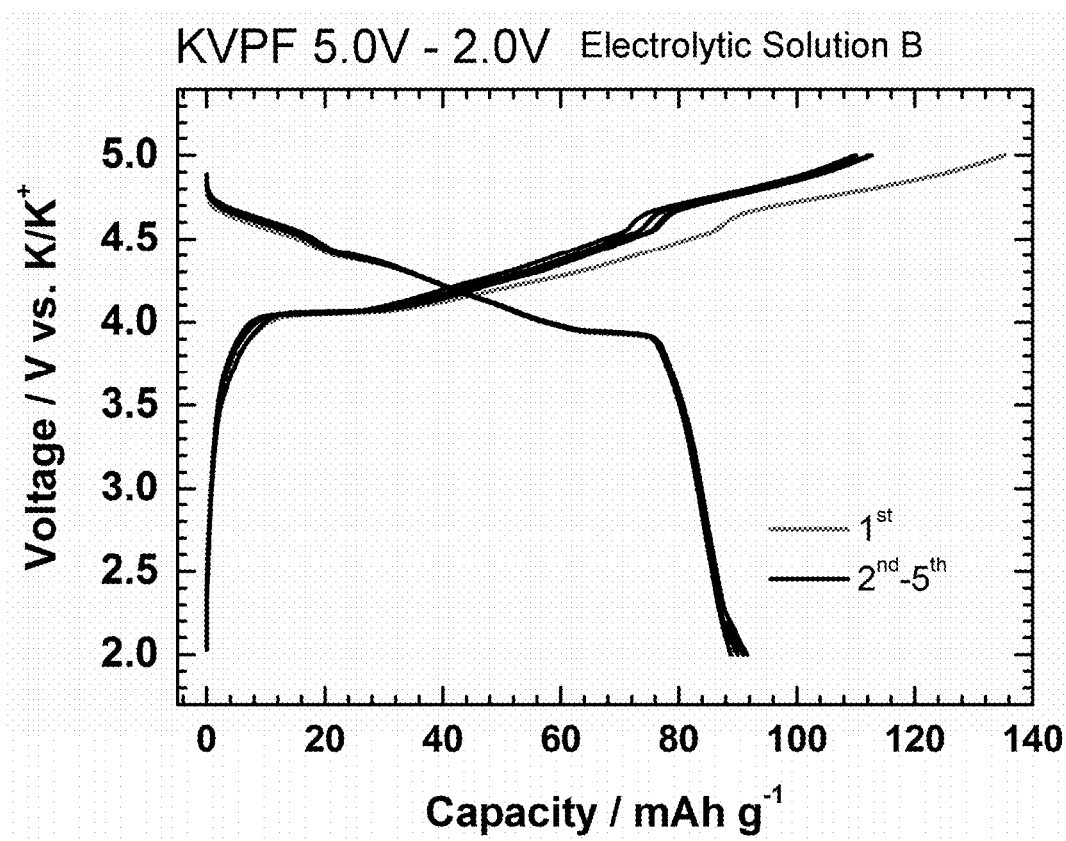
FIG. 10 is a charge-discharge profile up to the fifth cycle when a positive electrode for a potassium ion battery containing KVPF and acetylene black as a conductive aid, and an electrolytic solution B is used, and the charge-discharge voltage is set to from 5.0 V to 2.0 V.
Figure 11:
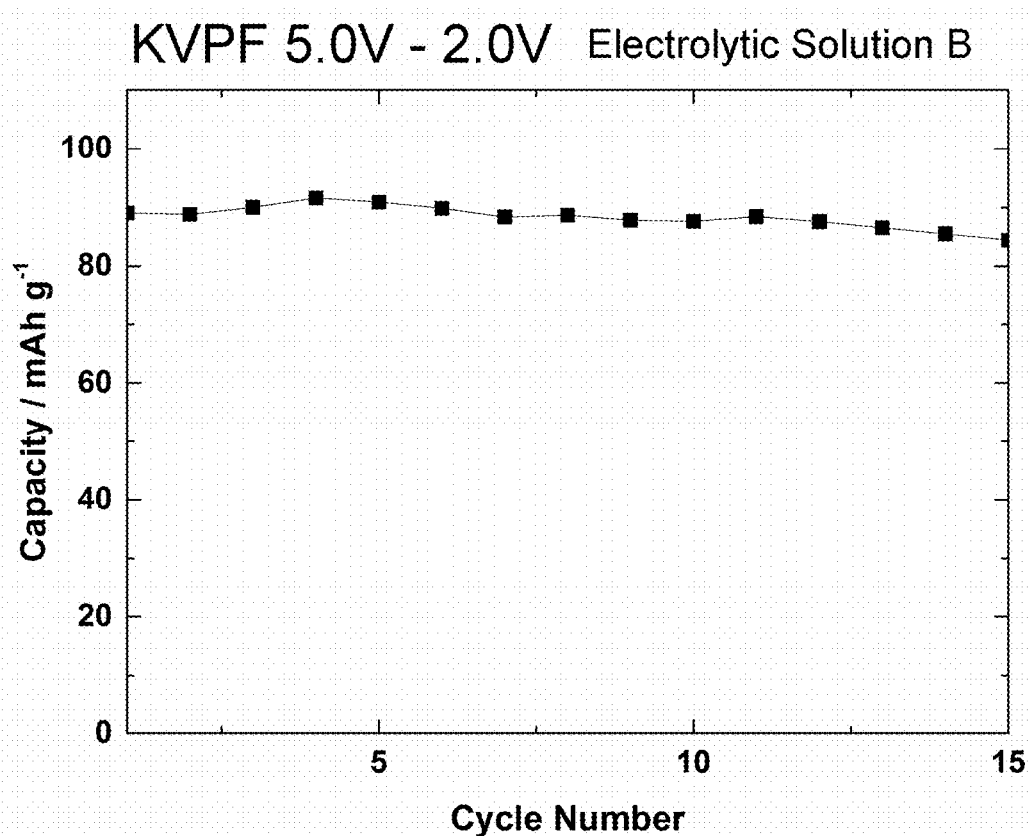
FIG. 11 is a diagram showing a change in reversible capacity in the course of a cycle when a positive electrode for a potassium ion battery containing KVPF, and acetylene black as a conductive aid, and an electrolytic solution A are used, and the charge-discharge voltage is set to from 5.0 V to 2.0 V.

FIGS. 5, 9, and 11 show change in the reversible capacity over the course of cycle. In FIGS. 5, 9, and 11, the ordinate represents the reversible capacity (Capacity, unit: mAh/g), and the abscissa represents Cycle Number.

As described above, by using the positive electrode active material for a potassium ion battery according to the embodiment, a potassium ion battery having high output and having less deterioration in the charge-discharge capacity even after repeated charging and discharging was obtained.

<Measurement of Charging and Discharging When Charging Rate is Changed>

Figure 14:
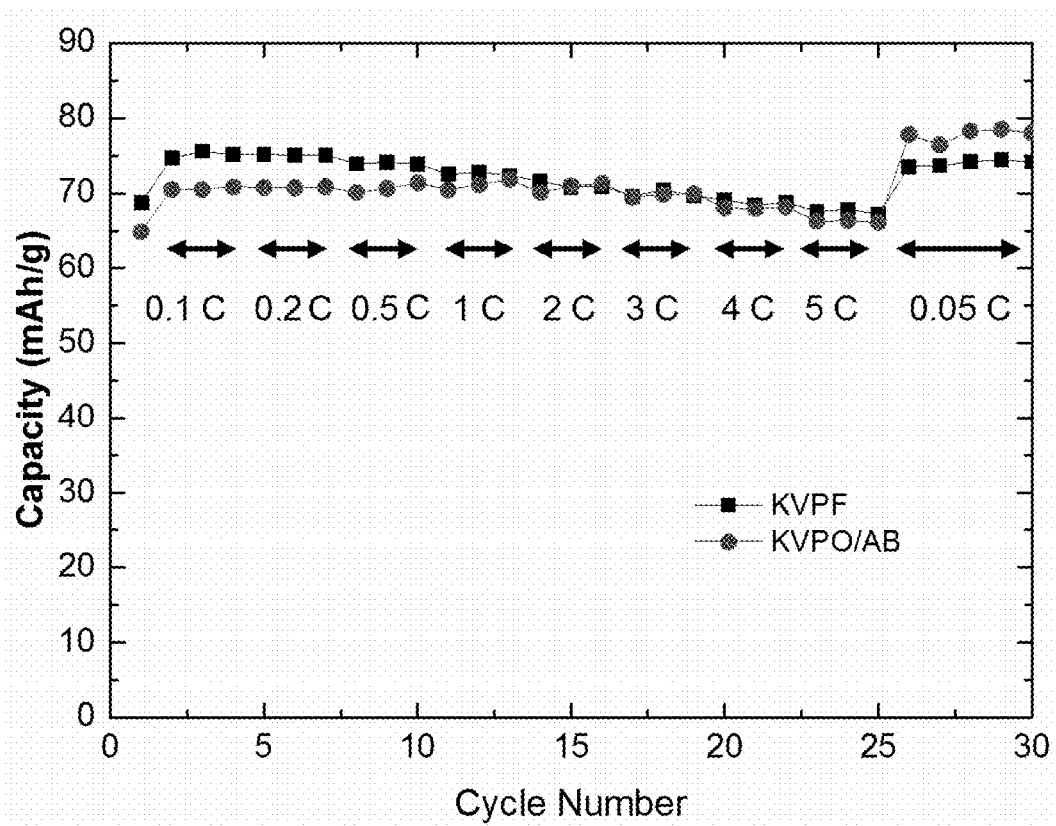
FIG. 14 is a diagram showing a change in reversible capacity in the course of a cycle when a positive electrode for a potassium ion battery containing KVPF or KVPO/AB, and acetylene black as a conductive aid, and an electrolytic solution A are used, and the charging rate is changed.

The measurement was carried out in the same manner as the charging and discharging measurement except using the prepared positive electrode for a potassium ion battery (KVPF or KVPO/AB) and changing the charging rate in each cycle from 0.05 C to 5 C as described in FIG. 14. The measurement results are shown in FIG. 14. The charging rate in the first cycle is 0.05 C.

In FIG. 14, the ordinate represents the reversible capacity (Capacity, unit: mAh/g), and the abscissa represents Cycle Number.

Figure 15:
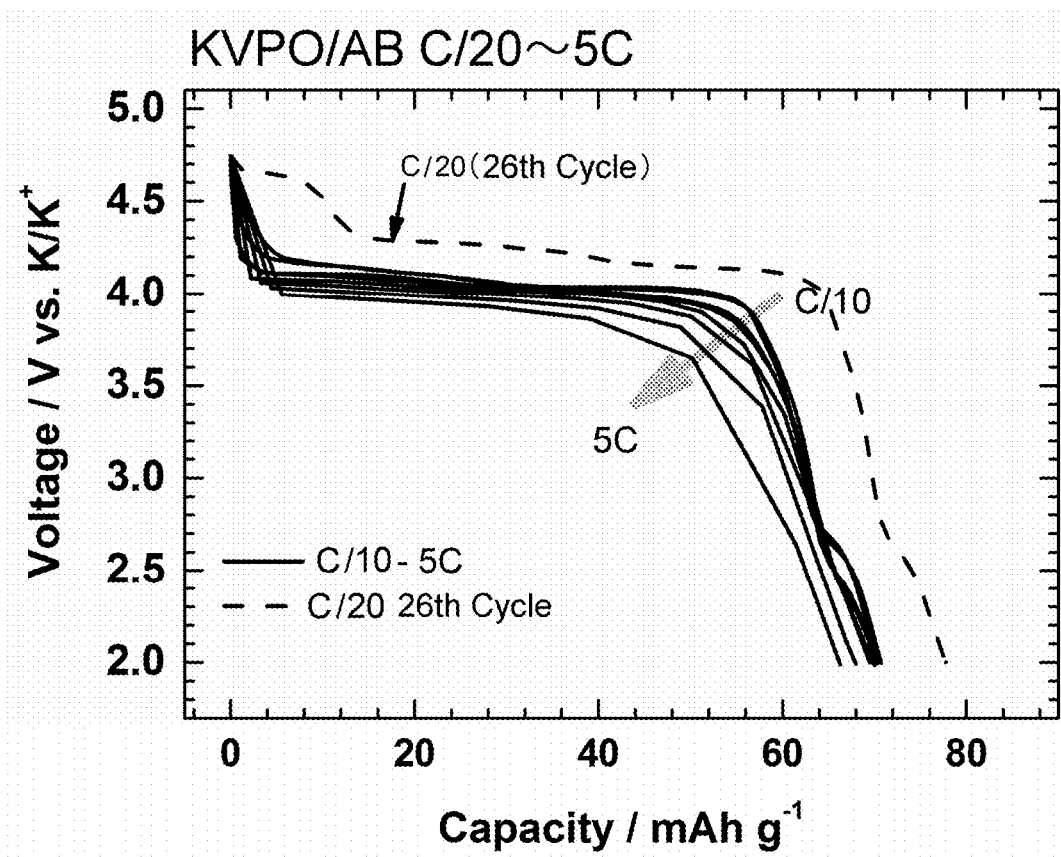
FIG. 15 is a charge-discharge profile in the course of a cycle when a positive electrode for a potassium ion battery containing KVPO/AB, and acetylene black as a conductive aid, and an electrolytic solution A are used, and the charging rate is changed.
Figure 16:
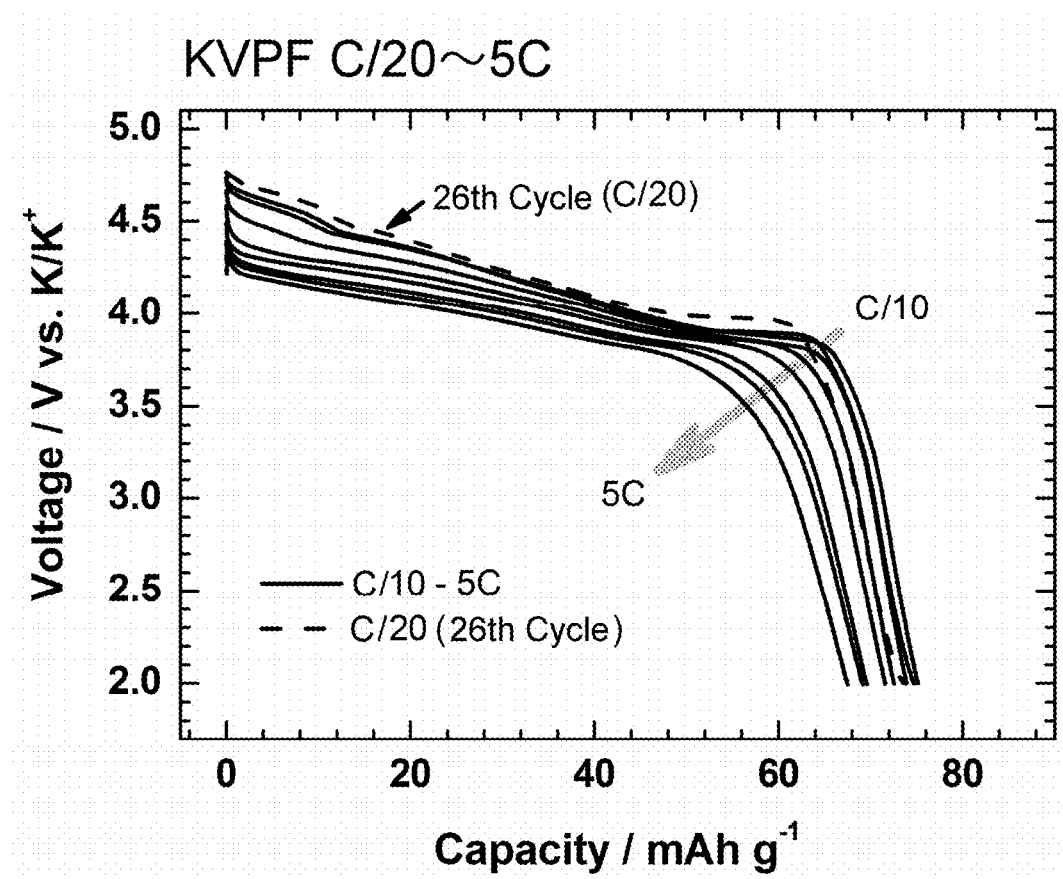
FIG. 16 is a charge-discharge profile in the course of a cycle when a positive electrode for a potassium ion battery containing KVPF, and acetylene black as a conductive aid, and an electrolytic solution A are used, and the charging rate is changed.

FIG. 15 and FIG. 16 show charge-discharge profiles in the course of cycle when the charging rate was changed in the case of using each positive electrode active material for a potassium ion battery.

As shown in FIG. 14, it is found that, by using the positive electrode active material for a potassium ion battery according to the embodiment, in the potassium ion battery, the charging rate is changed and the charge-discharge capacity is hardly deteriorated even when charging and discharging is repeated.

Example 4

<Synthesis of $KVO_{0.5}PO_4F_{0.5}$>

A mixture prepared by mixing ammonium metavanadate ($NH_4VO_3$, manufactured by Aldrich Company), ammonium dihydrogen phosphate ($NH_4H_2PO_4$, manufactured by Wako Pure Chemical Industries, Ltd.), and potassium carbonate ($K_2CO_3$, manufactured by Wako Pure Chemical Industries, Ltd.) in water at a stoichiometry ratio of 1:1:0.25 in a 1% by mass hydrogen peroxide solution and dehydrating to dryness at 140° C. was put into a crucible, and subjected to solid phase firing under an argon (Ar) gas atmosphere, and a precursor was synthesized. By wrapping a mixture obtained by adding KF to the obtained precursor in such a manner that the element composition ratio was V:P:K:F=1:1:1:0.5 with copper foil, solid phase firing at 800° C., and cooling slowly, $KVO_{0.5}PO_4F_{0.5}$ was obtained.

<Preparation of Positive Electrode for Potassium Ion Battery>

A positive electrode was prepared by applying a mixture of the obtained $KVO_{0.5}PO_4F_{0.5}$, acetylene black (AB, manufactured by Denki Kagaku Kogyo Co., Ltd.), and PVDF (polyvinylidene fluoride, manufactured by Kureha Corporation) at a mass ratio of 70:25:5 on aluminum foil (Hohsen Corp., thickness: 0.017 mm). The shape of a positive electrode not containing aluminum foil was a cylindrical shape having a diameter of 10 mm and a thickness of from 0.03 mm to 0.04 mm. The mass of a positive electrode not containing aluminum foil was from 3 mg to 5 mg.

<Measurement of Charging and Discharging>

Figure 17:
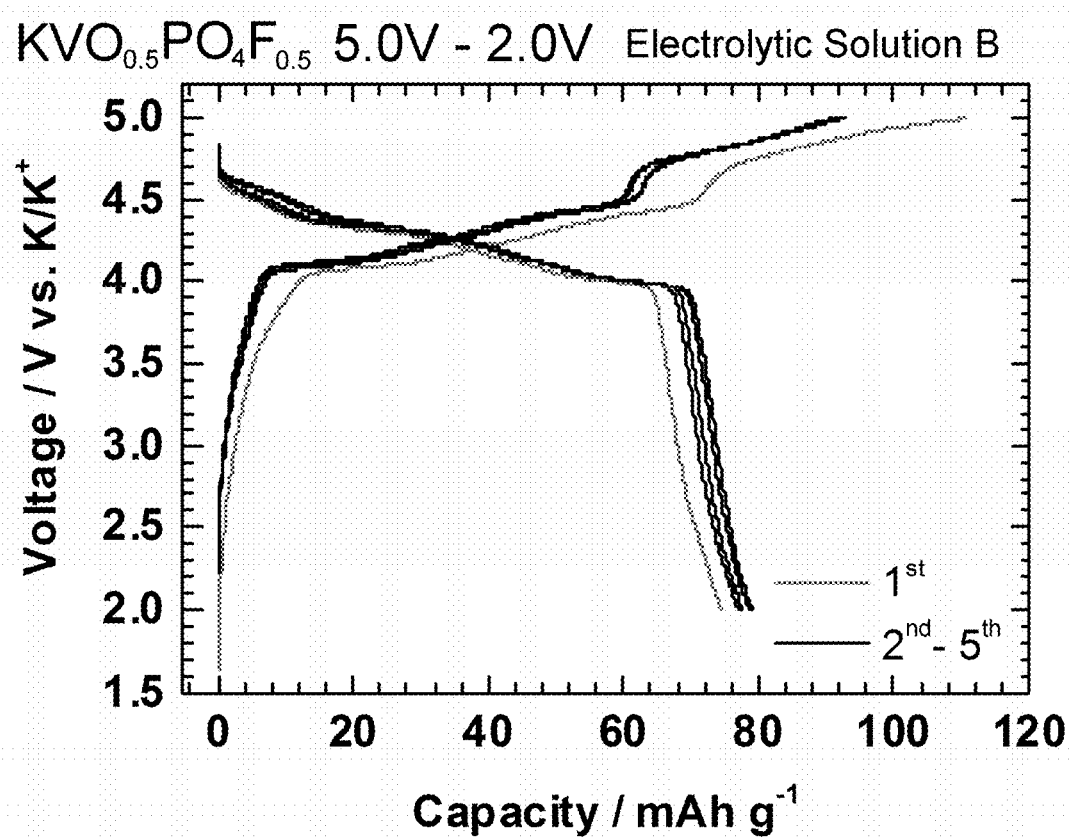
FIG. 17 is a charge-discharge profile up to the fifth cycle when a positive electrode for a potassium ion battery containing $KVO_{0.5}PO_4F_{0.5}$ and acetylene black as a conductive aid, and an electrolytic solution B is used, and the charge-discharge voltage is set to from 5.0 V to 2.0 V.
Figure 18:
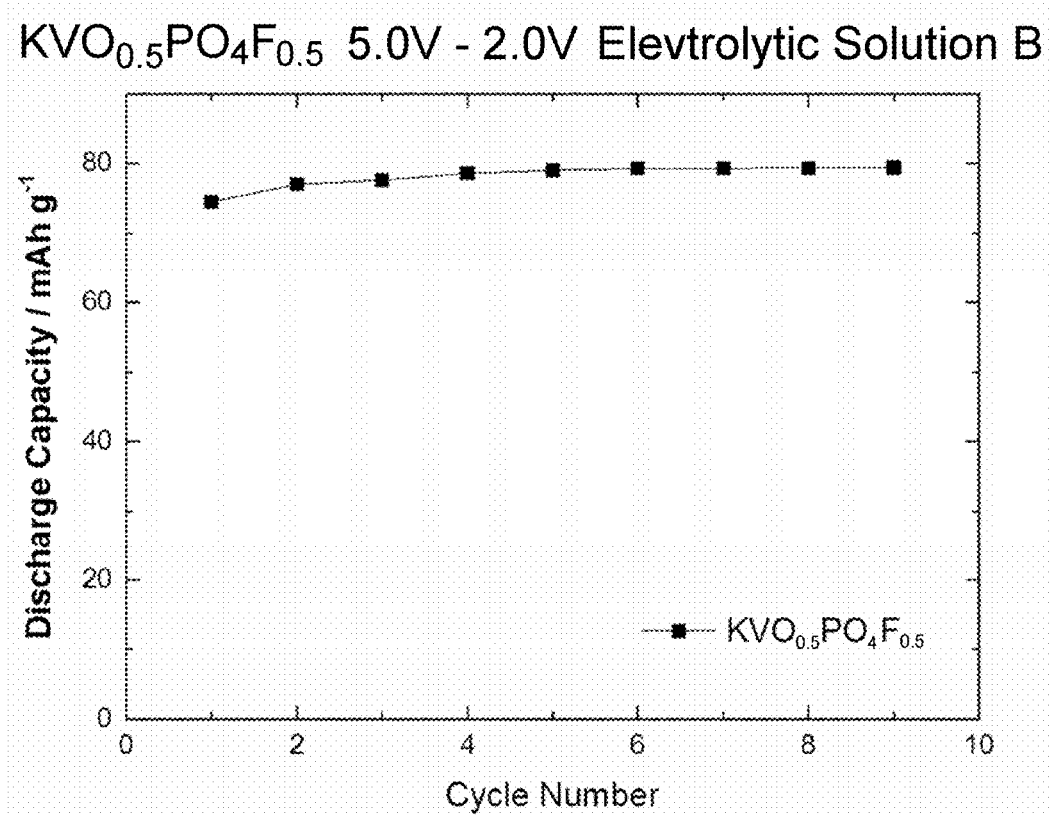
FIG. 18 is a diagram showing a change in reversible capacity in the course of a cycle when a positive electrode for a potassium ion battery containing $KVO_{0.5}PO_4F_{0.5}$, and acetylene black as a conductive aid and an electrolytic solution A are used, and the charge-discharge voltage is set to from 5.0 V to 2.0 V.

Using the electrolytic solution B and using the positive electrode obtained in Example 4, the charging rate was set to 0.05 C (coulomb, 1 C=133 mAh), and constant current charging was performed to a charge voltage of 5.0 V. The measurement was performed in the same manner as the charging and discharging measurement except that after charging, the charge voltage was 5.0 V and the constant current discharging was repeated until the discharge end voltage was 2.0 V. One charging and discharging is defined as one cycle, and reversible capacities (Capacity, unit: mAh/g, where h represents hour) measured in a specific cycle is shown in FIG. 17 and FIG. 18.

As shown in Example 4, by using the positive electrode active material for a potassium ion battery according to the embodiment, a potassium ion battery having high output and having less deterioration in the charge-discharge capacity even after repeated charging and discharging was obtained.

The disclosure of Japanese Patent Application No. 2016-229130 filed on Nov. 25, 2016 is hereby incorporated by reference in its entirety.

All Documents, Patent Applications, and technical standards described herein are incorporated by reference herein to the same extent as if each of the Documents, Patent Applications, and technical standards had been specifically and individually indicated to be incorporated by reference.

REFERENCE SIGNS LIST

10: Potassium ion battery, 12: Battery case (negative electrode side), 14: Gasket, 16: Negative electrode, 18: Separator, 20: Positive electrode, 22: Spacer, 24: Leaf spring, 26: Battery case (positive electrode side)

What is claimed is:

1. A positive electrode active material for a potassium ion battery, the positive electrode active material comprising a compound represented by the following Formula (1):

$$KMO_xPO_4F_{1-x} \quad \text{[Formula (1)]}$$

wherein, in Formula (1), M represents at least one element selected from the group consisting of V, Fe, Co, Ni, and Mn, and x represents a number higher than 0 and less than 1.

2. The positive electrode active material for a potassium ion battery according to claim 1, wherein M in Formula (1) is V.

3. A positive electrode for a potassium ion battery, the positive electrode comprising the positive electrode active material for a potassium ion battery according to claim 1.

4. A potassium ion battery, comprising the positive electrode for a potassium ion battery according to claim 3.

5. A method utilizing the positive electrode active material according to claim 1 in a potassium ion battery comprising:
   preparing a positive electrode that comprises the positive electrode material; and
   assembling the positive electrode with a negative electrode and an electrolyte to form a potassium ion battery.

* * * * *